(12) United States Patent
Yotsumoto et al.

(10) Patent No.: US 11,279,778 B2
(45) Date of Patent: Mar. 22, 2022

(54) POLYDIFLUOROACETYLENE, METHOD FOR PRODUCING POLYDIFLUOROACETYLENE, PRECURSOR POLYMER, MOLDED ARTICLE AND POWDER

(71) Applicant: DAIKIN INDUSTRIES, LTD., Osaka (JP)

(72) Inventors: Yuki Yotsumoto, Osaka (JP); Ryouichi Yano, Osaka (JP); Masahiro Tomita, Osaka (JP)

(73) Assignee: DAIKIN INDUSTRIES. LTD., Osaka (JP)

( * ) Notice: Subject to any disclaimer, the term of this patent is extended or adjusted under 35 U.S.C. 154(b) by 0 days.

(21) Appl. No.: 16/645,230

(22) PCT Filed: Jul. 27, 2018

(86) PCT No.: PCT/JP2018/028248
§ 371 (c)(1),
(2) Date: Mar. 6, 2020

(87) PCT Pub. No.: WO2019/054064
PCT Pub. Date: Mar. 21, 2019

(65) Prior Publication Data
US 2020/0299428 A1    Sep. 24, 2020

(30) Foreign Application Priority Data

Sep. 12, 2017  (JP) .............................. JP2017-174829

(51) Int. Cl.
*C08F 138/02* (2006.01)
(52) U.S. Cl.
CPC .................. *C08F 138/02* (2013.01)
(58) Field of Classification Search
CPC ...... C08F 38/00; C08F 138/00; C08F 238/00; C08F 8/26
See application file for complete search history.

(56) References Cited

U.S. PATENT DOCUMENTS

| 2,456,255 | A |   | 12/1948 | Coffman et al. |
| 4,481,366 | A | * | 11/1984 | Hiyama ................. C08F 30/08 526/194 |
| 4,678,842 | A | * | 7/1987  | Sandler .................... C08F 8/26 525/326.2 |
| 4,904,739 | A |   | 2/1990  | Sandler |
| 5,650,526 | A |   | 7/1997  | Roussel et al. |
| 5,744,561 | A |   | 4/1998  | Kappler |

FOREIGN PATENT DOCUMENTS

| GB | 698215 A | 10/1953 |
| GB | 771520 A | 4/1957 |
| JP | 58-059208 A | 4/1983 |
| JP | 59-215303 A | 12/1984 |
| JP | 62-143912 A | 6/1987 |
| JP | 08-81492 A | 3/1996 |
| JP | 08-231645 A | 9/1996 |
| JP | 2004-175764 A | 6/2004 |

OTHER PUBLICATIONS

Gould, J. Am. Chem. Soc. 1999, 121, 3781-3782 & Supporting Information, p. S1-S10 (Year: 1999).*
International Search Report for PCT/JP2018/028248 dated Oct. 30, 2018 (PCT/ISA/210).
Communication dated Mar. 31, 2021 by the European Patent Office in application No. 18855961.1.
International Preliminary Report on Patentability with the translation of Written Opinion dated Mar. 17, 2020, from the International Searching Authority in International Application No. PCT/JP2018/028248.

* cited by examiner

*Primary Examiner* — Robert C Boyle
(74) *Attorney, Agent, or Firm* — Sughrue Mion, PLLC

(57) ABSTRACT

A polydifluoroacetylene containing a C═C bond and a C—F bond, the polydifluoroacetylene having a solubility of 0.2 g/10 g or less in dimethylformamide (DMF) at 25° C. Also disclosed is a method for producing the polydifluoroacetylene, a precursor polymer for providing the polydifluoroacetylene, a molded article including the polydifluoroacetylene and a polydifluoroacetylene powder.

7 Claims, 1 Drawing Sheet

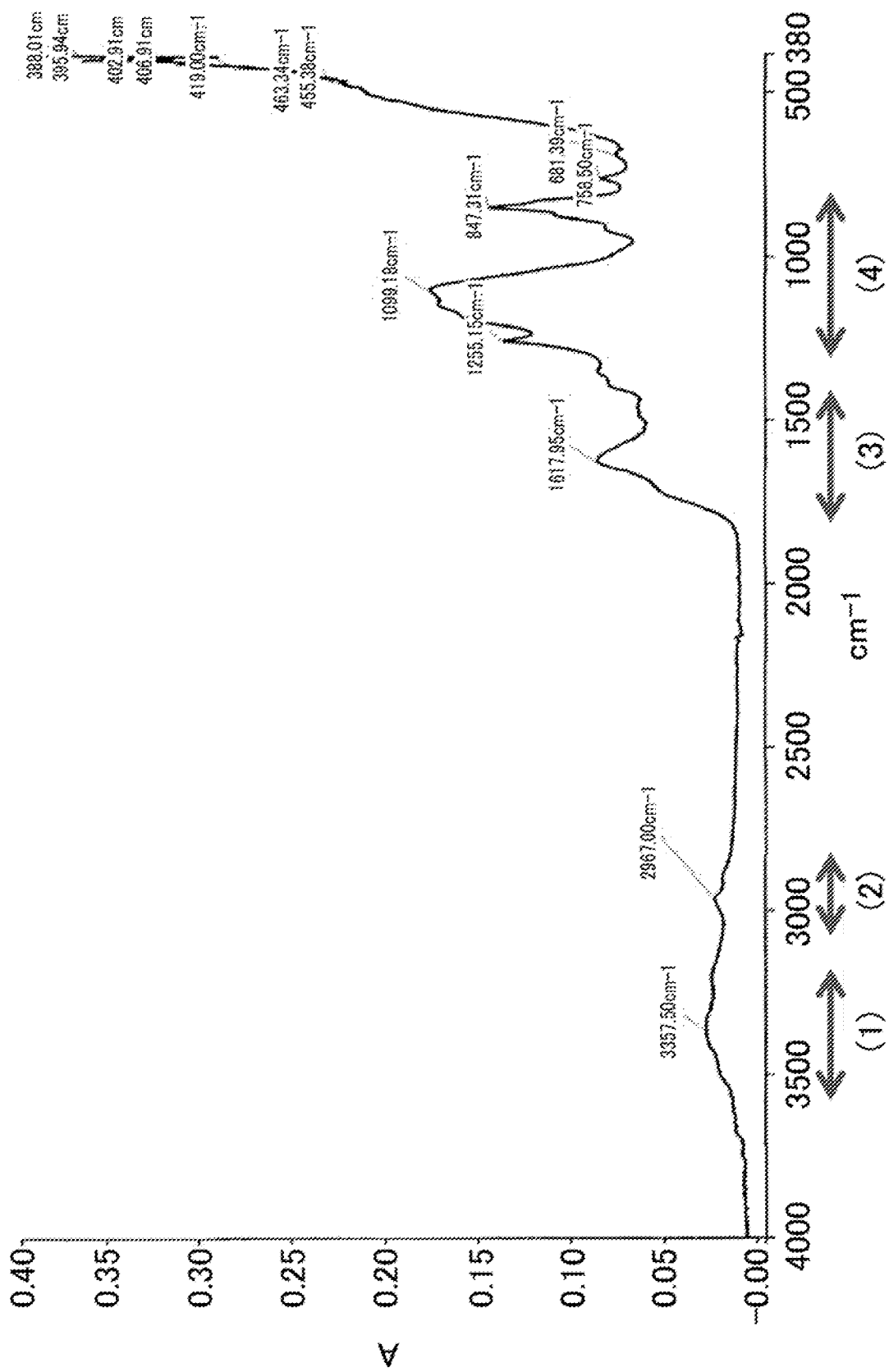

POLYDIFLUOROACETYLENE, METHOD FOR PRODUCING POLYDIFLUOROACETYLENE, PRECURSOR POLYMER, MOLDED ARTICLE AND POWDER

CROSS REFERENCE TO RELATED APPLICATIONS

This application is a National Stage of International Application No. PCT/JP2018/028248 filed Jul. 27, 2018, claiming priority based on Japanese Patent Application No. 2017-174829 filed Sep. 12, 2017.

TECHNICAL FIELD

The invention relates to polydifluoroacetylenes, methods for producing a polydifluoroacetylene, precursor polymers, molded articles, and powders.

BACKGROUND ART

Conductive polymers have attracted attention recently. A typical conductive polymer is polyacetylene. Polyacetylene is produced from acetylene. Production thereof involves use of a large amount of catalyst, which is unsuitable to industrial processes. Disadvantageously, polyacetylene is easy to oxidatively degrade in the air. This leads to development of other conductive polymers. An example thereof is polydifluoroacetylene.

For example, Patent Literature 1 proposes a polydifluoroacetylene that contains a difluorovinylene group —CF=CF— as a repeating unit and that is represented by the formula (—CF—CF—)$_n$ (wherein n is a natural number).

Patent Literature 2 proposes a method for producing a di-substituted acetylene high polymer including polymerizing a specific di-substituted acetylene compound in the presence of a halide of at least one element selected from Si, As, Sb, and P.

Patent Literature 3 proposes a method for producing a fluorine-containing polymer including electrochemically polymerizing a specific trifluorovinylsilane-based compound in the presence of a support electrolyte.

CITATION LIST

Patent Literature

Patent Literature 1: JP S58-59208 A
Patent Literature 2: JP S59-215303 A
Patent Literature 3: JP S62-143912 A

SUMMARY OF INVENTION

Technical Problem

Unfortunately, the techniques of Patent Literature documents 1 and 2 have disadvantages of significant instability of the material acetylene compounds and difficulty in handling these compounds. Further, the resulting polymers dissolve in solvents such as dimethylformamide, so that they are difficult to wash after the reactions and leave impurities. In the technique of Patent Literature 3, a silyl group remains binding to a main chain carbon atom of the polymer, causing a failure in providing a completely fluorinated polydifluoroacetylene. A method of dehydrofluorinating polyvinylidene fluoride seems to be another method for producing polyacetylene fluoride. Still, a hydrogen atom remains binding to a main chain carbon atom of the polymer and the repeating unit becomes —CF=CH—, causing in theory a failure in providing polydifluoroacetylene.

In view of the above current state of the art, the invention aims to provide a novel polydifluoroacetylene, a novel method for producing a polydifluoroacetylene, a novel precursor polymer for providing a polydifluoroacetylene, a novel molded article, and a novel powder.

Solution to Problem

The invention relates to a polydifluoroacetylene containing a C=C bond and a C—F bond, the polydifluoroacetylene having a soluble amount of 0.2 g/10 g or less in dimethylformamide (DMF) at 25° C.

The polydifluoroacetylene preferably has a degree of fluorination of 0.90 or higher determined by ATR analysis.

The polydifluoroacetylene preferably has a decomposition percentage of 1.0% or lower by 2-hour heating at 100° C. in an air atmosphere.

The invention also relates to a method for producing a polydifluoroacetylene including performing a dehydrohalogenation reaction on a precursor polymer comprising a repeating unit represented by the following formula (1): —CHF—CFX— (wherein X is F, Cl, Br, or I) to provide a polydifluoroacetylene.

The dehydrohalogenation reaction is preferably performed by reacting the precursor polymer with a dehydrohalogenating agent.

The invention also relates to a precursor polymer for providing a polydifluoroacetylene by a dehydrohalogenation reaction, the precursor polymer containing a repeating unit represented by the following formula (1): —CHF—CFX— (wherein X is F, Cl, Br, or I) and having a weight average molecular weight of 50000 to 1000000 in polystyrene equivalent.

The invention also relates to a molded article containing the polydifluoroacetylene.

The invention also relates to a powder containing the polydifluoroacetylene.

Advantageous Effects of Invention

The polydifluoroacetylene of the invention has the aforementioned structure, and is therefore highly fluorinated and has a high molecular weight. The method for producing a polydifluoroacetylene of the invention can easily produce a highly fluorinated, high molecular weight polydifluoroacetylene. The precursor polymer of the invention can provide a highly fluorinated, high molecular weight polydifluoroacetylene. The molded article of the invention and the powder of the invention are novel molded article and powder containing a highly fluorinated, high molecular weight polydifluoroacetylene.

BRIEF DESCRIPTION OF THE DRAWINGS

FIG. 1 is a diagram of an exemplary attenuated total reflection (ATR) chart used for measurement of the degree of fluorination.

DESCRIPTION OF EMBODIMENTS

The invention will be described in detail below.

The polydifluoroacetylene of the invention contains a C=C bond and a C—F bond. The presence of a C=C bond and a C—F bond in the polydifluoroacetylene can be confirmed from an infrared absorption spectrum by the attenuated total reflection (ATR) technique.

The polydifluoroacetylene of the invention has a soluble amount of 0.2 g/10 g or less in dimethylformamide (DMF) at 25° C. Such a polydifluoroacetylene is highly fluorinated and has a high molecular weight. The polydifluoroacetylene of the invention is a non-polar linear molecule, and is basically insoluble in solvents. The soluble amount is preferably 0.1 g/10 g or less, more preferably 0.08 g/10 g or less, still more preferably 0.05 g/10 g or less.

The soluble amount is a value determined by the method to be described in the EXAMPLES below.

For the polydifluoroacetylene having a soluble amount within the above range, a dimethylformamide solution of the polydifluoroacetylene cannot be used to determine the viscosity average molecular weight. That the soluble amount is within the above range means the polydifluoroacetylene of the invention has a higher molecular weight than the polydifluoroacetylene in Patent Literature 1 that is soluble in dimethylformamide to the extent that the viscosity average molecular weight thereof can be determined.

The polydifluoroacetylene of the invention is highly fluorinated. That the polydifluoroacetylene is highly fluorinated as used herein means small proportions of atoms other than fluorine atoms are bonded to the carbon atoms constituting the main chain of the polydifluoroacetylene. Typical examples of the atoms other than fluorine atoms include hydrogen atoms, carbon atoms (carbon atoms in branches), oxygen atoms, silicon atoms, and halogen atoms other than fluorine atoms.

That the polydifluoroacetylene is highly fluorinated can be confirmed by determining the degree of fluorination by attenuated total reflection (ATR) analysis, for example. The polydifluoroacetylene having a degree of fluorination of 0.90 or higher can be regarded as being highly fluorinated.

The polydifluoroacetylene of the invention preferably has a degree of fluorination by the ATR analysis of 0.90 or higher, more preferably 0.95 or higher.

The degree of fluorination is a value determined by the method to be described in the EXAMPLES below.

Preferably, the polydifluoroacetylene of the invention is substantially completely fluorinated. That the polydifluoroacetylene is substantially completely fluorinated as used herein means substantially no atoms other than fluorine atoms are bonded to the carbon atoms constituting the main chain of the polydifluoroacetylene.

That the polydifluoroacetylene is substantially completely fluorinated can be confirmed by determining the degree of fluorination, for example. The polydifluoroacetylene having a degree of fluorination of 0.95 or higher can be regarded as being substantially completely fluorinated.

The polydifluoroacetylene of the invention preferably has a decomposition percentage of 1.0% or lower by 2-hour heating at 100° C. in an air atmosphere. Polyacetylene has oxidative degradability, and are therefore unsuitable to use for electric wires or semiconductors. On the contrary, the polydifluoroacetylene of the invention is highly fluorinated and thus has excellent resistance to oxidative degradation. The decomposition percentage is more preferably 0.8% or lower, still more preferably 0.6% or lower.

The decomposition percentage can be determined by TG-DTA.

The polydifluoroacetylene of the invention preferably has a ratio of fluorine atoms to carbon atoms of 0.90 or higher. Such a polydifluoroacetylene is highly fluorinated. The ratio of fluorine atoms to carbon atoms is more preferably 0.95 or higher.

The ratio of carbon to fluorine can be determined by elemental analysis or ESCA, for example.

The polydifluoroacetylene of the invention preferably consists essentially of a repeating unit represented by —CF=CF—.

That the polydifluoroacetylene consists essentially of a repeating unit represented by —CF=CF— can be indicated by a degree of fluorination of 0.95 or higher, for example.

The polydifluoroacetylene of the invention has a high molecular weight. The polydifluoroacetylene of the invention preferably has a weight average molecular weight of 50000 to 1000000, more preferably 70000 to 800000, still more preferably 100000 to 600000, in polystyrene equivalent. The weight average molecular weight is the weight average molecular weight based on the precursor polymer to be described later.

The polydifluoroacetylene of the invention preferably has a number average molecular weight of 5000 to 100000, more preferably 7000 to 100000, still more preferably 10000 to 100000, in polystyrene equivalent. The number average molecular weight is the number average molecular weight based on the precursor polymer to be described later.

The invention also relates to a method for producing a polydifluoroacetylene including performing a dehydrohalogenation reaction on a precursor polymer containing a repeating unit represented by the following formula (1):

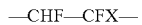

(wherein X is F, Cl, Br, or I) to provide a polydifluoroacetylene. The production method of the invention can easily produce a highly fluorinated, high molecular weight polydifluoroacetylene, and can suitably produce the aforementioned polydifluoroacetylene of the invention, for example.

Possible methods for producing a polydifluoroacetylene include a production method by homopolymerization of difluoroacetylene and a production method by a post-treating reaction on a precursor polymer. For homopolymerization of difluoroacetylene, difluoroacetylene itself is a significantly unstable substance and the polymerization has to be cryogenic polymerization. Thus, this production method is unsuitable to industrial processes. Accordingly, a production method by a post-treating reaction on a precursor polymer is suitable to industrial processes. Still, no precursor polymer that can be highly fluorinated and no such post-treatment method have been known. In the production method of the invention, a dehydrohalogenation reaction (post-treatment) on a specific precursor polymer enables easy production of a highly fluorinated polydifluoroacetylene.

The precursor polymer used in the production method of the invention contains a repeating unit represented by the formula (1). In the formula (1), X is F, Cl, Br, or I. The precursor polymer is easy to dehydrohalogenate.

The precursor polymer preferably consists of a repeating unit represented by the formula (1). That the precursor polymer consists only of a repeating unit represented by the formula (1) can be confirmed by appropriate combination of any of NMR, FT-IR, elemental analysis, and X-ray fluorescence analysis.

The precursor polymer preferably has a weight average molecular weight of 50000 to 1000000, more preferably 70000 to 800000, still more preferably 100000 to 600000, in polystyrene equivalent. The weight average molecular weight can be determined by gel permeation chromatography (GPC).

The precursor polymer preferably has a number average molecular weight of 5000 to 100000, more preferably 7000 to 100000, still more preferably 10000 to 100000, in polystyrene equivalent. The number average molecular weight can be determined by gel permeation chromatography (GPC).

Too low a molecular weight of the precursor polymer may cause decomposition of the polymer due to a hydrohalogenating agent (base) to be described later. Too high a molecular weight thereof may cause a portion unreacted with the hydrohalogenating agent to remain.

The precursor polymer preferably has a melting point of 150° C. to 250° C., more preferably 180° C. to 220° C. The melting point is the temperature corresponding to the maximum value on a heat-of-fusion curve obtained by increasing the temperature at a rate of 10° C./min using a differential scanning calorimeter (DSC).

The dehydrohalogenation reaction is preferably performed by reacting the precursor polymer with a dehydrohalogenating agent. This allows the precursor polymer to be highly dehydrohalogenated.

For the precursor polymer that is polytrifluoroethylene, poly(1-chloro-1,2-difluoroethylene), poly(1-bromo-1,2-difluoroethylene), or poly(1-iodo-1,2-difluoroethylene), the dehydrohalogenating agent may be a base such as lithium ethoxide, sodium ethoxide, potassium ethoxide, lithium hydroxide, sodium hydroxide, potassium hydroxide, n-butyllithium, or t-butyllithium.

For the precursor polymer that is polytrifluoroethylene, the dehydrohalogenating agent used is particularly preferably a non-nucleophilic base. The non-nucleophilic base is a base having very strong basicity but having poor nucleophilicity. Use of a non-nucleophilic base as the dehydrohalogenating agent reduces nucleophilic attacks by the dehydrohalogenating agent on the main chain carbon atoms of the precursor polymer. This can reduce side reactions due to such nucleophilic attacks and enables efficient dehydrohalogenation, resulting in production of a more highly fluorinated polydifluoroacetylene. Examples of the non-nucleophilic base include lithium diisopropylamide (LDA), lithium tetramethylpiperidide (LiTMP), and lithium hexamethyldisilazide (LHMDS). Preferred among these is LHMDS.

In the dehydrohalogenation reaction, the dehydrohalogenating agent is preferably used in an amount of 1 to 10 mol, more preferably 1 to 5 mol, per mole of the monomer unit of the precursor polymer.

The dehydrohalogenation reaction can be performed in a solvent. The solvent is preferably an organic solvent, and examples thereof include ethanol, diethyl ether, chloroform, tetrahydrofuran (THF), N, N-dimethylformamide (DMF), dimethyl sulfoxide (DMSO), and fluorine-based solvents. Preferred among these are THF and DMF.

The temperature of the dehydrohalogenation reaction is preferably −78° C. to 20° C., more preferably −78° C. to −30° C.

The duration of the dehydrohalogenation reaction is preferably 0.5 to 12 hours, more preferably 1 to 6 hours.

Completion of the dehydrohalogenation reaction may be followed by separation and purification of the product by, for example, evaporation of the solvent, washing, centrifugation, filtration, or recrystallization.

The production method of the invention may further include a step of providing the precursor polymer by polymerizing a monomer (I) represented by the following formula (1):

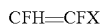

CFH=CFX (wherein X is F, Cl, Br, or I). The monomer (I) is a stable compound and is therefore easy to handle. This enables more easy production of a highly fluorinated, high molecular weight polydifluoroacetylene.

The polymerization may be suspension polymerization, emulsion polymerization, solution polymerization, or the like. From the viewpoint of easiness of post-treatment, for example, preferred is aqueous suspension polymerization or emulsion polymerization.

In the polymerization, a polymerization initiator, a surfactant, a chain transfer agent, and a solvent may be used. Each may be a conventionally known one.

The invention also relates to a precursor polymer for providing a polydifluoroacetylene by a dehydrohalogenation reaction, containing a repeating unit represented by the following formula (1):

—CHF—CFX—

(wherein X is F, Cl, Br, or I), and having a weight average molecular weight of 50000 to 1000000 in polystyrene equivalent. A dehydrohalogenation reaction on the precursor polymer of the invention can provide a polydifluoroacetylene. Accordingly, the precursor polymer of the invention can suitably be used as a precursor of a polydifluoroacetylene. Further, the precursor polymer of the invention having a weight average molecular weight within the above range less causes decomposition of the polymer due to the aforementioned dehydrohalogenating agent (base) and less causes a portion unreacted with the dehydrohalogenating agent to remain. Accordingly, use of the precursor polymer of the invention enables easy production of a highly fluorinated polydifluoroacetylene.

X in the formula (1) is preferably F or Cl.

The precursor polymer of the invention preferably consists only of a repeating unit represented by the formula (1).

The weight average molecular weight is preferably 70000 to 800000, more preferably 100000 to 600000. The precursor polymer of the invention preferably has a number average molecular weight of 5000 to 100000, more preferably 7000 to 100000, still more preferably 10000 to 100000 in polystyrene equivalent.

The precursor polymer of the invention preferably has a melting point of 150° C. to 250° C., more preferably 180° C. to 220° C.

The precursor polymer of the invention can be produced by an identical method for the precursor polymer used in the aforementioned production method of the invention.

The invention also relates to a molded article containing the aforementioned polydifluoroacetylene of the invention. The polydifluoroacetylene of the invention has a significantly high molecular weight and is difficult to melt or dissolve in a solvent for processing. Thus, the polydifluoroacetylene is difficult to directly mold into a molded article. Nevertheless, the inventors successfully provide a molded article containing the polydifluoroacetylene of the invention by the method for producing a molded article to be described later. The polydifluoroacetylene of the invention in the form of a molded article can significantly exhibit the properties thereof.

In the molded article of the invention, the amount of the polydifluoroacetylene of the invention is preferably 95% by mass or more, more preferably 97% by mass or more, still more preferably 99% by mass or more, relative to the whole amount of the molded article. The molded article of the invention particularly preferably consists only of the polydifluoroacetylene of the invention.

For the molded article of the invention containing a different component other than the polydifluoroacetylene of the invention, examples of the different component include polytetrafluoroethylene (PTFE) and a precursor polymer (e.g., polytrifluoroethylene) containing a repeating unit represented by the formula (1).

The precursor polymer may be an unreacted precursor polymer in the method for producing a molded article to be described later.

The molded article of the invention may be in the form of, but not limited to, fibers, a film, a sheet, a rod, or a pipe.

The molded article of the invention is preferably in the form of fibers or a film.

The molded article of the invention in the form of fibers preferably has a fiber diameter of 1 to 2000 μm, more preferably 10 to 1000 μm.

The fiber length thereof may be, but is not limited to, 0.1 mm or longer, and may be 1 mm or longer.

The molded article of the invention in the form of a film preferably has a thickness of 1 to 1000 μm, more preferably 10 to 500 μm.

The molded article of the invention can suitably be produced by a production method including pre-molding a precursor polymer containing a repeating unit represented by the formula (1) to provide a pre-molded article, and performing a dehydrohalogenation reaction on the precursor polymer in the pre-molded article to convert it into a polydifluoroacetylene, thereby providing a molded article containing the polydifluoroacetylene.

The pre-molding of the precursor polymer can be performed by any molding technique usually performed on thermoplastic materials, such as injection molding, extrusion molding, compression molding, blow molding, calender molding, casting, melt spinning, or solution spinning, in accordance with factors such as the type, application, and shape of the target molded article. The method may be combination of any of the above molding techniques.

If a different component is used, it may be added, but not limited to, before the pre-molding or during the pre-molding.

The dehydrohalogenation reaction can be performed under the same conditions as in the dehydrohalogenation reaction in the aforementioned production method of the invention.

The invention also relates to a powder containing the aforementioned polydifluoroacetylene of the invention. The powder may consist only of the polydifluoroacetylene of the invention.

The powder of the invention preferably has an average particle size of 0.05 to 500 μm, more preferably 0.1 to 300 μm.

The average particle size can be determined using a laser diffraction particle size distribution analyzer or a dry-mode particle size distribution analyzer.

The powder of the invention can be produced by the use of power of a precursor polymer as a material in the aforementioned production method of the invention, for example. If necessary, the particle shape or the particle size of the precursor polymer powder may be adjusted before the dehydrohalogenation reaction.

The powder of the invention can suitably be used as filler to be added to a different polymer (a polymer to be a matrix) other than the polydifluoroacetylene of the invention, for example.

Examples of the different polymer include fluororesins such as polytetrafluoroethylene (PTFE), TFE/perfluoro(alkyl vinyl ether) (PAVE) copolymers (PFA), TFE/hexafluoropropylene (HFP) copolymers (FEP), ethylene/TFE copolymers (ETFE), and polyvinylidene fluoride (PVDF); fluoroelastomers such as VdF/HFP copolymers; polyolefin resins such as polyethylene and polypropylene; polyamide (PA) resins such as nylon 6, nylon 11, nylon 12, nylon 46, nylon 66, nylon 610, nylon 612, and nylon MXD6; polyesters such as polyethylene terephthalate (PET), polybutylene terephthalate (PBT), polyarylate, aromatic polyester (including liquid crystal polyester), and polycarbonate (PC); polyacetal (POM) resins; polyether resins such as polyphenylene oxide (PPO), modified polyphenylene ether, and polyether ether ketone (PEEK); polyamide-imide (PAI) resins such as polyaminobismaleimide; polysulfone-based resins such as polysulfone (PSF) and polyethersulfone (PES); and vinyl polymers such as ABS resin and poly(4-methylpentene-1) (TPX resin), as well as polyphenylene sulfide (PPS), polyketone sulfide, polyetherimide, and polyimide (PI).

Examples of the polyolefin resins include polymers obtainable by polymerization of α-olefins, such as polyethylene (PE), polypropylene (PP), ethylene-propylene copolymers, polystyrene (PS), AS resin (AS), ABS resin (ABS), methacrylic resin (PMMA), polymethylpentene (PMP), butadiene resin (BDR), polybutene-1 (PB-1), polyvinyl alcohol (PVA), polyacrylonitrile (PAN), polymethacryl styrene (MS), ethylene-vinyl acetate copolymers (EVA), ethylene-vinyl alcohol copolymers, and polyvinyl chloride (PVC).

The polyolefin resins preferably include at least one selected from the group consisting of low-density polyethylene (LDPE), linear low-density polyethylene (LLDPE), metallocene linear low-density polyethylene (mLLDPE), medium-density polyethylene (MDPE), high-density polyethylene, polypropylene (PP), polystyrene (PS), ethylene-vinyl acetate copolymers (EVA), and polyvinyl chloride (PVC). The polyolefin resins more preferably include at least one selected from the group consisting of low-density polyethylene, linear low-density polyethylene, high-density polyethylene, metallocene linear low-density polyethylene, polypropylene, polystyrene, and polyvinyl chloride.

In the case of using the powder as filler, the amount of the powder of the invention used is preferably less than 95% by mass, more preferably 90% by mass or less, still more preferably 85% by mass or less, of the total amount of the powder and the different polymer. The amount thereof is preferably 0.1% by mass or more, more preferably 3% by mass or more.

The polydifluoroacetylene of the invention is highly fluorinated and has a high molecular weight, and thereby has excellent properties such as conductivity and resistance to oxidative degradation. Thus, the polydifluoroacetylene, molded article, and powder of the invention can suitably be used in a variety of applications requiring these properties. Examples of the applications include electric wires, electrodes, semiconductors, and actuators.

The molded article of the invention in the form of fibers or a film can particularly suitably be used as an electrode material.

EXAMPLES

The invention is described in more detail with reference to examples, but the invention is not intended to be limited by these examples.

The parameters in the examples were determined by the following methods.

(Soluble Amount)

The soluble amount was determined as follows. First, 1 g of the polymer was mixed with 10 g of DMF at 25® C. They were stirred for one hour and the mixture was centrifuged for separation. The supernatant was evaporated to dryness and the solid content was quantified as the amount of the polymer in the supernatant. This amount was used as the soluble amount.

The solid content was determined using a halogen moisture analyzer MB45 available from OHAUS.

(Degree of Fluorination by ATR Analysis)

As indicated by the following formula, the degree of fluorination was determined as the ratio of the sum of the peaks having the respective highest absorbances among the peaks assigned to C=C bond and C—F bond with the zero absorbance taken as the baseline to the sum of the peaks having the respective highest absorbances among the peaks assigned to each of the assignable bonds with the zero absorbance taken as the baseline.

$$\frac{\text{Sum of peaks having respective highest absorbances among peaks assigned to C=C bond and C—F bond}}{\text{Sum of peaks having respective highest absorbances among peaks assigned to each of assignable bonds}} \quad [\text{Math. 1}]$$

For example, The ATR chart in FIG. 1 includes:

(1) the peak assigned to O—H bond having an absorbance height from 0 of 0.02;

(2) the peak assigned to C—H bond having an absorbance height from 0 of 0.02;

(3) the peak assigned to C=C bond having an absorbance height from 0 of 0.08; and (4) the peak assigned to C—F bond having an absorbance height from 0 of 0.18.

The ratio of the sum of the peaks (3) and (4) having the respective highest absorbances to the sum of the peaks (1) to (4) having the respective highest absorbances was taken as the degree of fluorination. The degree of fluorination in FIG. 1 is (0.08+0.18)/(0.02+0.02+0.08+0.18)–0.87.

The ATR analysis was performed using SPECTRUM ONE available from PerkinElmer Co., Ltd.

(Molecular Weight)

The molecular weight was calculated using the precursor polymer.

The precursor polymer was dissolved in tetrahydrofuran, whereby a 0.1 wt % solution was prepared.

The solution was subjected to gel permeation chromatography (GPC), whereby the molecular weight in polystyrene equivalent was determined.

The GPC analysis was performed using HLC-8020 available from Tosoh Corp.

(Decomposition Percentage)

The decomposition percentage was calculated by TG-DTA in the air atmosphere at 100° C. for two hours.

TG-DTA was performed using TG/DTA7200 available from Hitachi High-Tech Science Corp.

Synthesis Example 1

(Synthesis of Precursor Polymer)

A 4-L glasslined pressure-resistant container was charged with 1200 g of ion-exchanged (IE) water and purged with nitrogen in vacuo. The container was further charged with 800 g of octafluorocyclobutane (C318), and then stirring of the contents was initiated.

Trifluoroethylene was charged into the container up to 0.6 MPa. As the temperature inside the container was confirmed to be 20° C., 15 g of 7H-dodecafluoroheptanoyl peroxide was added to initiate the reaction.

After initiation of the reaction, 7H-dodecafluoroheptanoyl peroxide and trifluoroethylene were added as appropriate so as to maintain the pressure inside the container at 0.6 MPa. The stirring was stopped 15 hours later, and the gas inside the container was purged with nitrogen, whereby 80 g of powder was obtained.

The resulting powder was washed with IE water and dried at 120° C. for 24 hours.

The dried powder had a weight average molecular weight of 540000 in polystyrene equivalent and a number average molecular weight of 89000 in polystyrene equivalent.

The dried powder was analyzed by ATR. As a result, a peak assigned to C—F bond and a peak assigned to C—H bond were detected.

This polymer had a degree of fluorination of 0.73.

The melting point of the dried powder was measured using DSC (X-DSC7000 available from Hitachi High-Tech Science Corp.) at 10° C./min and within the temperature range of 30° C. to 300° C. and found to be 197° C.

Example 1

(Dehydrohalogenation Reaction Using Potassium Ethoxide)

A 300-mL three-neck flask was charged with the precursor polymer (1.0 g) in Synthesis Example 1, 50 mL of ethanol, and potassium ethoxide (2.0 g) in an inert gas atmosphere. The contents were reacted at 90° C. for 24 hours under stirring. The reaction was followed by addition of IE water and centrifugation, whereby black powder (0.8 g) was obtained. The resulting powder was washed with IE water and then dried at 100° C. for 24 hours.

The average particle size of the resulting dried powder was measured using Microtrac MT3300 EXII available from MictrotracBEL Corp. and found to be 250 μm.

The dried powder was analyzed by ATR. As a result, a peak assigned to C=C bond and a peak assigned to C—F bond, as well as a peak assigned to C—H bond and a peak assigned to O—H bond were detected.

The degree of fluorination of the resulting polymer was calculated from the peak intensities obtained by ATR, and found to be 0.93.

The soluble amount was 0.05 g/10 g in DMF at 25° C.

The decomposition percentage measured in the air atmosphere at 100° C. was 0.5%.

Example 2

(Dehydrohalogenation Reaction Using nBuLi)

A 300-mL three-neck flask was charged with the precursor polymer (3.0 g) in Synthesis Example 1 and THF (50 mL) in an inert gas atmosphere, and the contents were dissolved. The flask was cooled down to −78° C. in a dry ice acetone bath and nBuLi in hexane (30 mL, 1.6 M) was dropwise added over three hours. The dropwise addition was followed by 3-hour stirring and addition of IE water (100 mL). The mixture was filtered for separation, whereby black powder (2.2 g) was obtained. The resulting powder was repeatedly washed with IE water, acetone, and THF in turn, and further washed with IE water. The powder was then dried at 100° C. for 24 hours.

The average particle size of the resulting dried powder was measured using Microtrac MT3300 EXII available from MictrotracBEL Corp. and found to be 200 un.

The dried powder was analyzed by ATR. As a result, a peak assigned to C=C bond and a peak assigned to C—F bond, as well as a peak assigned to C-Hi bond were detected.

The degree of fluorination of the resulting polymer was calculated from the peak intensities obtained by ATR, and found to be 0.92.

The soluble amount was 0.05 q/10 g in DMF at 25° C.

The decomposition percentage measured in the air atmosphere at 100° C. was 0.5%.

Example 3

(Dehydrohalogenation Reaction Using LHMDS)

A 300-mL three-neck flask was charged with the precursor polymer (3.0 g) in Synthesis Example 1 and THF (50 mL) in an inert gas atmosphere, and the contents were dissolved. The flask was cooled down to −78° C. in a dry ice acetone bath and LHMDS in THF (55 mL, 1.0 M) was dropwise added over three hours. The dropwise addition was followed by 3-hour stirring and addition of IE water (100 mL). The mixture was filtered for separation, whereby black powder (2.2 g) was obtained.

The resulting powder was repeatedly washed with IE water, acetone, and THF in turn, and further washed with IE water. The powder was then dried at 100° C. for 24 hours.

The average particle size of the resulting dried powder was measured using Microtrac MT3300 EXII available from MictrotracBEL Corp. and found to be 200 μm.

The dried powder was analyzed by ATR. As a result, a peak assigned to C=C bond and a peak assigned to C—F bond were detected.

The degree of fluorination of the resulting polymer was calculated from the peak intensities obtained by ATR, and found to be 0.96.

The ratio of fluorine atoms to carbon atoms obtained by ESCA was 0.95.

The soluble amount was 0.05 g/10 g in DMF at 25° C.

The decomposition percentage measured in the air atmosphere at 100° C. was 0.4%.

Comparative Example 1

(Dehydrohalogenation Reaction of Polyvinylidene Fluoride (PVDF))

A 300-mL three-neck flask was charged with PVDF (3.0 g) having a weight average molecular weight of 550000 in polystyrene equivalent and a number average molecular weight of 90000 in polystyrene equivalent and THF (50 mL) in an inert gas atmosphere, and the contents were dissolved. The flask was cooled down to −78° C. in a dry ice acetone bath and LHMDS in THF (70 mL, 1.0 M) was dropwise added over three hours. The dropwise addition was followed by 3-hour stirring and addition of IE water (100 mL). The mixture was filtered for separation, whereby gray powder (2.0 g) was obtained.

The resulting powder was repeatedly washed with IE water, acetone, and THF in turn, and further washed with IE water. The powder was then dried at 100° C. for 24 hours.

The average particle size of the resulting dried powder was measured using Microtrac MT3300 EXII available from MictrotracBEL Corp. and found to be 230 μm.

The dried powder was analyzed by ATR. As a result, no peak assigned to C=C bond was observed, while a peak assigned to C—F bond and a peak assigned to C—H bond were detected. No observation of a peak assigned to C=C bond presumably means that the conjugated portion was fluorinated and part of the polymer main chain formed a C—F chain to constitute a PTFE-like structure.

The degree of fluorination of the resulting polymer was calculated from the peak intensities obtained by ATR, and found to be 0.85.

The soluble amount was 0.1 g/10 g in DMF at 25° C.

The decomposition percentage measured in the air atmosphere at 100° C. was 0.5%.

Example 4

(Production of Polydifluoroacetylene Film)

The precursor polymer prepared in Synthesis Example 1 was molded into a 200-μm-thick film by heat pressing.

A petri dish was charged with 5 mL of 1.0 M LHMDS in THF, and a 1-cm-square piece cut out of the molded film was immersed therein. The reaction proceeded immediately after immersion. About one minute later, a glossy black film was obtained.

The resulting glossy black film was repeatedly washed with IE water, acetone, and THF in turn, and further washed with IE water. The film was then dried at 100° C. for 24 hours. The dried film was analyzed by ATR. As a result, a peak assigned to C=C bond and a peak assigned to C—F bond were detected.

The degree of fluorination of the resulting polymer was calculated from the peak intensities obtained by ATR, and found to be 0.96.

The ratio of fluorine atoms to carbon atoms obtained by ESCA was 0.96.

The soluble amount was 0.05 g/10 g in DMF at 25° C.

The decomposition percentage measured in the air atmosphere at 100° C. was 0.4%.

Example 5

(Production of Polydifluoroacetylene Fiber)

The precursor polymer prepared in Synthesis Example 1 was formed into a fiber having a fiber diameter of 500 μn using Capilograph.

A test tube was charged with 5 mL of 1.0 M LHMDS in THF, and the fiber cut into the length of 5 cm was immersed therein under tension. The reaction proceeded immediately after immersion. About two minutes later, a glossy black fiber was obtained.

The resulting glossy black fiber was repeatedly washed with IE water, acetone, and THF in turn, and further washed with IE water. The fiber was then dried at 100° C. for 24 hours. The dried fiber was analyzed by ATR. As a result, a peak assigned to C=C bond and a peak assigned to C—F bond were detected.

The degree of fluorination of the resulting polymer was calculated from the peak intensities obtained by ATR, and found to be 0.96.

The ratio of fluorine atoms to carbon atoms obtained by ESCA was 0.96.

The soluble amount was 0.05 g/10 g in DMF at 25° C. The decomposition percentage measured in the air atmosphere at 100° C. was 0.5%.

INDUSTRIAL APPLICABILITY

The polydifluoroacetylene, molded article, and powder of the invention can be used in a variety of applications requiring properties such as conductivity and resistance to oxidative degradation.

The method for producing a polydifluoroacetylene of the invention can easily produce a highly fluorinated, high molecular weight polydifluoroacetylene.

The precursor polymer of the invention can be used as a precursor of a polydifluoroacetylene.

The invention claimed is:

1. A polydifluoroacetylene comprising a C=C bond and a C—F bond,
    the polydifluoroacetylene having a soluble amount of 0.2 g/10 g or less in dimethylformamide (DMF) at 25° C. and a degree of fluorination of 0.95 or higher as determined by ATR analysis.

2. The polydifluoroacetylene according to claim 1, wherein the polydifluoroacetylene has a decomposition percentage of 1.0% or lower by 2-hour heating at 100° C. in an air atmosphere.

3. A molded article comprising the polydifluoroacetylene according to claim 1.

4. A powder comprising the polydifluoroacetylene according to claim 1.

5. The polydifluoroacetylene according to claim 1, wherein the polydifluoroacetylene has a weight average molecular weight of 50000 to 1000000.

6. The polydifluoroacetylene according to claim 1, wherein the polydifluoroacetylene has a weight average molecular weight of 70000 to 800000.

7. The polydifluoroacetylene according to claim 1, wherein the polydifluoroacetylene has a weight average molecular weight of 100000 to 600000.

* * * * *